United States Patent
Horinouchi et al.

[11] Patent Number: 5,980,716
[45] Date of Patent: *Nov. 9, 1999

[54] WATER TREATMENT APPARATUS FOR A FUEL CELL SYSTEM

[75] Inventors: Hiroshi Horinouchi, Tokyo; Kunihiro Nishizaki, Kofu; Shigeaki Sato, Yokohama; Fumio Azakami, Chiba; Toshiaki Deguchi, Sayama, all of Japan

[73] Assignees: Tokyo Gas Co., Ltd.; Kurita Water Industries, Ltd., both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,189

[22] Filed: Dec. 6, 1996

[30] Foreign Application Priority Data

Dec. 6, 1995 [JP] Japan ................................ 7-317960

[51] Int. Cl.$^6$ .................................................. C02F 1/469
[52] U.S. Cl. ........................... 204/524; 204/533; 204/536; 204/542; 204/632; 429/14; 429/26; 210/188; 210/263

[58] Field of Search ...................................... 204/524, 533, 204/536, 542, 632; 210/188, 263; 429/14, 26

[56] References Cited

U.S. PATENT DOCUMENTS

| | | |
|---|---|---|
| 4,157,298 | 6/1979 | van den Berg et al. ............. 210/38 D |
| 5,259,972 | 11/1993 | Miyamaru et al. ..................... 210/652 |
| 5,503,729 | 4/1996 | Batchelder et al. ..................... 204/630 |
| 5,554,295 | 9/1996 | Ban et al. ............................... 210/668 |
| 5,571,419 | 11/1996 | Obata et al. ............................ 210/664 |

*Primary Examiner*—Arun S. Phasge
*Attorney, Agent, or Firm*—Morrison Law Firm

[57] ABSTRACT

Low conductivity cooling water for a fuel cell body is obtained by a water treatment apparatus which removes dissolved carbon dioxide gas in the exhaust gas condensate by a decarbonation column. Iron oxide is eliminated from the condensate as well as blowdown water by a MF membrane separator device. Iron ions are removed by a chelate resin column. Deionization occurs with an electrodeionizer which has an internal ion exchange resin.

2 Claims, 2 Drawing Sheets

PRIOR ART

WATER TREATMENT APPARATUS FOR A FUEL CELL SYSTEM

BACKGROUND OF THE INVENTION

The present invention relates to a water treatment apparatus for a fuel cell system. In particular, the present invention relates to a water treatment apparatus which continually removes iron oxide, dissolved carbon dioxide, organic material, and trace ions generated in the water system of a phosphoric acid fuel cell electric power plant, without relying on the use of added chemicals. The present invention also relates to a water treatment apparatus that recycles treated water for use as cooling water for the body of the fuel cell system.

Referring to FIG. 2, there is shown a flow diagram of a conventional small size phosphoric acid fuel cell system 1. A fuel cell 5 has an anode 3, a cathode 4, and an electrolyte 2. A cooling unit 6 which cools fuel cell 5 is placed inside a fuel cell body 7.

Fuel such as natural gas or the like is brought in by a pipe 10. Inside a reformer 11, this gas is reformed into a hydrogen-rich gas by steam brought in from a steam separator 23 via a pipe 12. Air is brought into reformer 11 by pipes 13, 13A to effect combustion. Reformer 11 also has unreacted fuel (hydrogen-rich exhaust gas from the anode) brought in by a pipe 14, and this becomes the heat source for the reform reaction. After its carbon monoxide component is transformed in a transformer 15, the reformed gas is brought to anode 3 by a pipe 16. The combustion exhaust gas of reformer 11 is sent to a condenser 19 by pipes 17, 18.

At cathode 4, air is brought in via pipes 13, 13B. The reformed gas brought to anode 3 is oxidized by an electrochemical reaction using this air, and electricity is generated. Exhaust gas from cathode 4 is sent to condenser 19 by pipes 18, 20.

The separated water from steam separator 23 is sent to cooling unit 6 as cooling water via pipe 24. Cooling water which has been heated by cooling unit 6 is returned to steam separator 23 by a pipe 27. This forms the cell body cooling water system. Treated water from water treatment apparatus 22 is delivered as needed by a pipe 25 to the cooling water system as make-up water.

The condensate separated in condenser 19 (hereinafter referred to as exhaust gas condensate) is sent to water treatment apparatus 22 via a pipe 21. Blowdown water from the cell body cooling system is brought to water treatment apparatus 22 by a pipe 29 from a heat exchanger 28. Exhaust gas is discharged outside the system by a pipe 19A.

In this relatively small scale phosphoric acid fuel cell system, the exhaust gas condensate from condenser 19 includes many impurities and contaminants. These impurities and contaminants include carbon dioxide, which is generated in reformer 11 and transformer 15, phosphate, iron, and the like. Similarly, the blowdown water from steam separator 23 also has iron and other impurities. Furthermore, because carbon steel pipes are usually used for the system piping of a fuel cell generator plant, the water recovered in water treatment apparatus 22 also contains a large amount of iron oxide and iron ions.

To achieve good electrical insulation and corrosion prevention in the cooling water system, the cooling water supplied to cooling unit 6 of fuel cell system 1 must have a low electroconductivity. For this reason, exhaust gas condensate from condenser 19 and blowdown water from the cell body cooling water system are recovered and treated by water treatment apparatus 22, which supplies the cell body cooling water system. Water treatment apparatus 22 is needed to remove impurities from the recovered water, and reduces ions to a sufficiently low concentration.

In a conventional water treatment device 22 of a fuel cell system, the recovered water is first passed through a mesh strainer, and any impurities are removed. Next, the water is passed through an activated carbon column to remove any organic materials. Finally, ions are removed by an ion exchange resin.

In a conventional water treatment apparatus, the mesh strainer quickly becomes clogged, due to the iron oxide in the recovered water. The activated carbon column in the following step also clogs quickly. Therefore, these must be replaced frequently. Furthermore, the iron ions not removed by the activated carbon column and remaining in the outflow water from the activated carbon column coat the surface of the ion exchange resin in the last step. Because of this, and because the recovered water is at a relatively high temperature (45° C.), degradation of the ion exchange resin is rapid, and the ion exchange resin must also be frequently replaced.

Because of the need to replace the mesh strainer, the activated carbon column, and the ion exchange resin frequently, the operating efficiency and processing efficiency of these systems are low. Therefore, the operating cost of water treatment by these systems is high.

To solve this problem, a large scale decarbonation column is used for decarbonation treatment. A strong oxidant such as chloride ion or the like is added in order to completely oxidize any iron ions in the recovered water. After removing these by coagulation filtration or the like, any remaining ions must still be removed by an ion exchange resin. As a result, the equipment becomes large and complex. The use of added chemicals further increases the costs.

OBJECTS AND SUMMARY OF THE INVENTION

Accordingly, it is an object of the present invention to overcome the drawbacks of the prior art described above.

It is further object of the present invention to provide a water treatment apparatus for a fuel cell system which removes carbon dioxide dissolved in high concentrations, iron oxide, iron ions, and the like from the recovered water continually and efficiently.

It is a further object of the present invention to provide a water treatment apparatus for a fuel cell system which does not rely on the use of added chemicals.

It is a further object of the present invention to provide a water treatment apparatus for a fuel cell system which is capable of obtaining cooling water which has low electroconductivity for the cell body.

Briefly stated, low conductivity cooling water for a fuel cell body is obtained by a water treatment apparatus which removes dissolved carbon dioxide gas in the exhaust gas condensate by a decarbonation column. Iron oxide is eliminated from the condensate as well as blowdown water by an MF membrane separator device. Iron ions are removed by a chelate resin column. Deionization occurs with an electrodeionizer which has an internal ion exchange resin.

According to an embodiment of the present invention, there is provided a water treatment apparatus for a fuel cell system, comprising decarbonation means, the decarbonation means being effective for removing dissolved carbon dioxide gas from water; a membrane filtration device, the membrane filtration device being effective for removing iron oxide from outflow water of the decarbonation means; an adsorption device, the adsorption device effective for selectively adsorbing ions in outflow water from the membrane filtration device; and an electrodeionizer, the electrodeionizer being effective for removing trace ions in outflow water from the adsorption device.

According to another embodiment of the present invention, there is provided a method for treating water in a fuel cell system, comprising the steps of removing dissolved carbon dioxide gas from the water; removing iron oxide from the water; removing iron ions; and treating the water by electrodeionization with an ion exchange resin and membrane to remove trace ions.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

In the present invention, a decarbonation means removes carbon dioxide gas in the exhaust gas condensate. Next, the iron oxide (colloidal state iron) and organic materials from the recovered water, which is a mixture of the decarbonated water and blowdown water, are removed by a membrane filtering device. Next, iron ions are removed by an adsorption device. After decarbonating and removing the colloidal iron and ionic iron, the remaining trace ions are removed by an electrodeionizer. The treated water obtained from the water treatment apparatus of the present invention is sent to a cooling water supply pipe of a steam separator. Part of the treated water is sent to the cooling unit and used as cooling water. The remaining water is used as a source of steam for fuel reforming in the fuel cell.

As a result, the present invention efficiently removes colloidal iron and ionic iron at an early stage. In addition, by removing the dissolved $CO_2$ from the exhaust gas condensate, the load on the ion exchange resin of the electrodeionizer created by carbon dioxide gas is efficiently eliminated. Both the generation of iron oxide and the resulting degradation of the ion exchange resin in the electrodeionizer are prevented. A low conductivity, high quality treated water is thereby obtained.

In the present invention, in order to further eliminate dissolved carbon dioxide gas, a membrane degasifier may be set up downstream from the adsorption device. After treating the outflow from the adsorption device with a membrane degasifier, the water may also be further treated with an electrodeionizer.

With the present invention, the equipment can be made compact, with a consequent reduction in processing costs. Treated water of a desired quality can be stably obtained without altering the materials, the structure, or the framework of the conventional fuel cell system.

Figure 1:
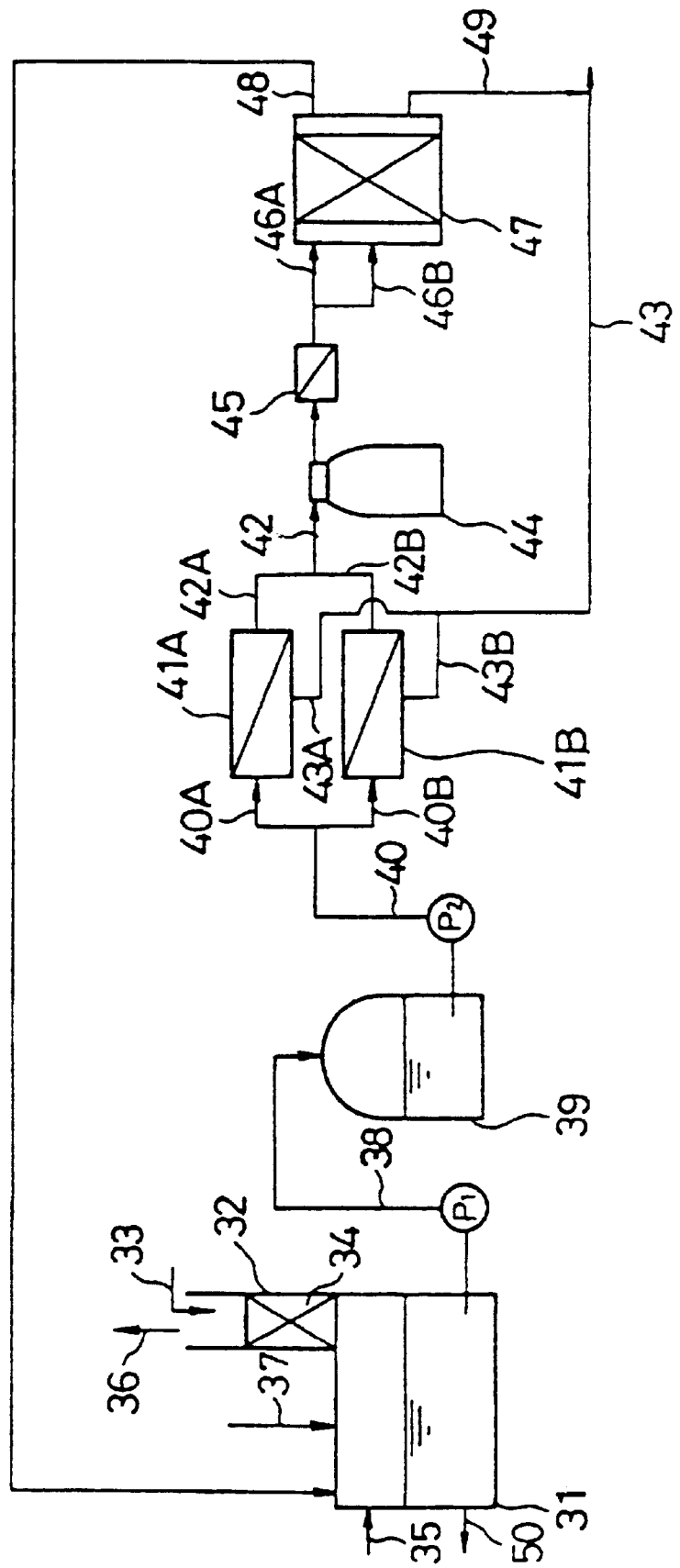
FIG. 1 is a flow diagram of an embodiment of a water treatment apparatus for a fuel cell system, according to the present invention.
Figure 2:
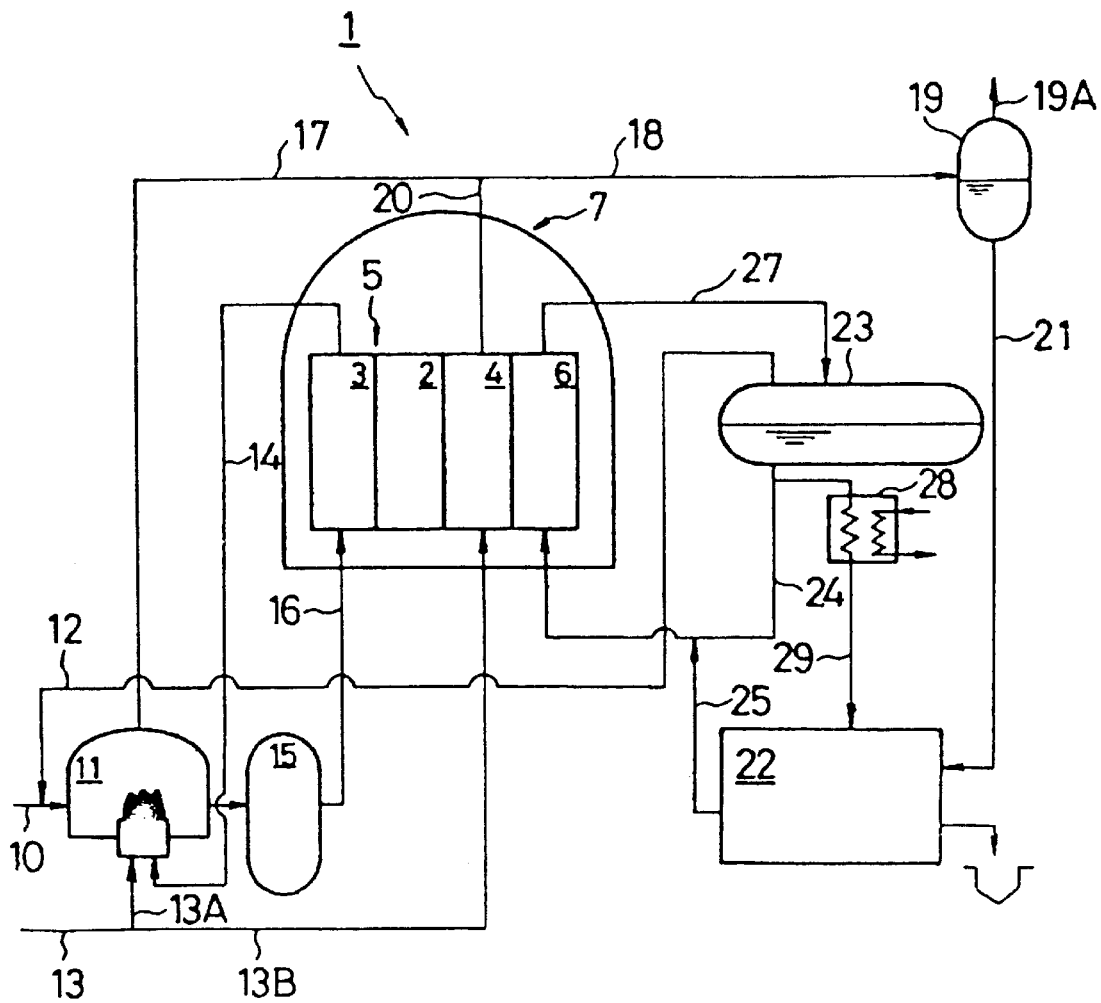
FIG. 2 is a flow diagram of a small phosphoric acid fuel cell system of the prior art.

Referring now to FIG. 1, a decarbonation column 32 (decarbonation means) is positioned above a fuel cell cistern 31 (recovered water tank), and exhaust gas condensate is introduced by a pipe 33. Decarbonation column 32 has a spacer material layer 34. At the surface of spacer material, exhaust gas condensate comes in contact in a counter current manner with air brought to fuel cell cistern 31 by a pipe 35. As a result the dissolved carbon dioxide in the exhaust gas condensate is removed. Exhaust gas is discharged outside the system by a pipe 36. The high temperature exhaust gas from the cathode of the fuel cell can be used as the air for decarbonation.

In fuel cell cistern 31, blowdown water is brought in by a pipe 37. Exhaust gas condensate which has been decarbonated by decarbonation column 32 and the blowdown water are together transported from fuel cell cistern 31 to a storage tank 39 by a pump P1 through a pipe 38.

The water from water storage tank 39 next passes through MF (microfiltration) membrane separator devices 41A, 41B (hereinafter membrane filtration devices 41A, 41B). Iron oxide, colloidal iron, and organic material are removed by membrane filtration devices 41A, 41B. Membrane filtration devices 41A, 41B are in parallel via pipes 40, 40A, and 40B from a pump P2. The concentrated water from membrane filtration devices 41A, 41B may, alternatively, bypass the rest of the treatment system by passage through pipes 43, 43A, and 43B.

The permeate from membrane filtration devices 41A, 41B is brought to a chelate resin column 44, acting as an adsorption device, via pipes 42, 42A, and 42B, where the remaining iron ions are adsorbed and removed.

The outflow water from chelate resin column 44 then passes through a safety filter 45 and is brought by pipes 46A and 46B to an electrodeionizer 47, where deionizing treatment takes place. Electrodeionizer 47 is equipped with ion exchange membranes and ion exchange resin. The ion exchange membranes comprise multiple alternating sheets of anion exchange membranes and cation exchange membranes. The space between an anion exchange membrane and the adjacent cation exchange membrane is a concentration compartment. The space between this cation exchange membrane and the next anion exchange membrane is a dilution compartment. The space between this next anion exchange membrane and the next cation exchange membrane is a concentration compartment, and so on. The concentration compartments alternate with dilution compartments (pipe 46A is connected to a dilution compartment of electrodeionizer 47 and pipe 46B is connected to a concentration compartment of electrodeionizer 47). Each dilution compartment is filled with a mixture of a cation exchange resin and an anion exchange resin. The ions flowing into each dilution compartment react with the mixed ion exchange resin depending on their affinity, concentration, and mobility. The ions move inside the mixed resin along the gradient of the electric potential and then move across the membrane, and neutralization of charges in all the compartments occurs. Due to the semi-permeable properties of the membrane and the direction of the electric potential gradient, ions decrease in the dilution compartments and become concentrated in the adjacent concentration compartments. Cations pass through the cation exchange membrane, and anions pass through the anion exchange membrane. Each becomes concentrated in the concentration compartments. The concentrated water from concentration compartments of electrodeionizer 47 is discharged from the system by a pipe 49. As a result, deionized water of an extremely high quality is recovered from the dilution compartments. A review of electrodeionization can be found in U.S. Pat. No. 4,632,745 (Giuffrida et al.) and U.S. Pat. No. 4,925,541 (Giuffrida et al.), the entirety of which are hereby incorporated by reference.

Deionized water obtained from the dilution compartment of electrodeionizer 47 is then returned to fuel cell cistern 31 via a pipe 48. From there, it supplements the cell body cooling water system from a pipe 50 as needed.

Unlike ion exchange resins, electrodeionizer 47 does not need to be regenerated. Complete, continuous deionization is possible. Also, if improvement in electroconductivity is desired, the concentration compartments can be filled with the same mixed resin as in the dilution compartments.

In the present invention, carbon dioxide, which is dissolved in high concentrations in the condensate and which would become a load on the subsequent step of the ion exchange resin, is efficiently removed by decarbonation column 32. Organic suspended solids, colloidal iron and the like which collect in the recovered water are efficiently removed by membrane filtration devices 41A, 41B. Furthermore, iron ion is removed by the chelate resin column. As a result, the water brought to electrodeionizer 47 is very low in iron particles and other impurities. For this reason, degradation of the ion exchange resin will not occur in electrodeionizer 47. Electrodeionizer 47 removes any remaining trace ions to a high degree, resulting in a high quality treated water.

The present invention will be described more specifically by citing experiments and embodiments.

EXPERIMENT 1

An experiment was conducted to measure the Fe removal effectiveness of the membrane filtration devices.

Water of differing water quality and including colloidal iron and ionic iron was treated with a membrane filtration device (membrane pore diameter 0.1 micrometer) at a water flow rate of 145 liters/min. The Fe removal rate was calculated from the Fe concentration of the inflow water and the outflow water. The results are shown in Table 1.

TABLE 1

| | Fe concentration (mg Fe/liter) | | Removal Rate |
|---|---|---|---|
| No. | Inflow water | Outflow water | (%) |
| 1 | 0.82 | 0.361 | 56 |
| 2 | 1.2 | 0.66 | 45 |
| 3 | 0.7 | 0.343 | 51 |
| 4 | 1.16 | 0.884 | 24 |

Referring to Table 1, although the membrane filtration device cannot remove colloidal iron particles smaller than its pore diameter and iron ions, the device is nonetheless effective as a pre-treatment step.

EXPERIMENT 2

An experiment was conducted to determine the Fe removal effectiveness of the membrane filtration device in conjunction with the chelate resin column.

After water of differing quality and including colloidal iron and ionic iron was treated by a membrane filtration device as in experiment 1, the outflow water from the membrane filtration device was passed through a chelate resin column filled with 20 liters of chelate resin (Lewatit TP207, from Bayer Co.) at a rate of 145 liters/hr. Fe removal rates were calculated from the Fe concentration of the inflow water entering the membrane filtration device and the Fe concentration of the outflow water from the chelate resin column. The results are shown in Table 2.

TABLE 2

| | Fe concentration (mg Fe/l) | | |
|---|---|---|---|
| No. | Inflow water of membrane filtration device | Outflow water of chelate resin column | Removal Rate (%) |
| 5 | 0.79 | 0.0066 | 99.2 |
| 6 | 0.88 | 0.0036 | 99.6 |
| 7 | 0.9 | 0.0036 | 99.6 |
| 8 | 0.75 | 0.0033 | 99.6 |

The results shown in Table 2 demonstrate that treatment with the membrane filtration device in conjunction with the chelate resin column efficiently and effectively removes colloidal iron and ionic iron.

EXPERIMENT 3

An experiment was conducted in order to determine the effectiveness of treatment of water with the electrodeionizer.

An electrodeionizer of the present invention has alternating layers of polyethylene anion exchange membranes and cation exchange membranes, with 10 layers of each (1 layer is approximately 300 cm$^2$). A mixed resin is made by mixing a strong acid H type anion exchange resin and a strong basic OH type anion exchange resin at a ratio of 40:60. The mixed resin (0.9 liter) is used to fill each of the dilution compartments. The experimental conditions were as shown below.

Experimental Conditions—Experiment 3

Water supply: 145 l/hr

Treated water: 120 l/hr

Concentrated water: 75 l/hr

Concentrated bleed water: 2.5 l

Applied voltage and current: as shown in Table 3

Water temperature: 40° C.

Table 3 shows the $CO_2$ concentration and electroconductivity of the inflow water, as well as the electroconductivity of the outflow water, at the given applied voltages and currents.

TABLE 3

| No. | 9 | 10 | 11 | 12 |
|---|---|---|---|---|
| Applied voltage (V) | 30 | 70 | 90 | 150 |
| Current (A) | 0.15 | 0.52 | 0.6 | 2.9 |
| $CO_2$ conc.- inflow (mg/l) | 9.4 | 8.6 | 10.8 | 17.7 |
| Inflow conductivity ($\mu$S/cm) | 5.9 | 5.5 | 5.9 | 6.7 |
| Outflow conductivity ($\mu$S/cm) | 3.3 | 2.9 | 1.6 | 0.5 |

Referring to Table 3, it can be seen that a high quality treated water can be obtained by passing water through an electrodeionizer. Any carbon dioxide remaining after decarbonation treatment is a load on the ion exchange resin in the electrodeionizer, but by increasing the applied voltage and the current, the electrodeionizer can respond effectively to the fluctuations in the dissolved $CO_2$.

EMBODIMENT 1

Referring now to FIG. 1, water recovered from a fuel cell system was treated in the apparatus shown.

A Raschig ring spacer layer was set up as a decarbonation column. Exhaust gas condensate was passed through this spacer layer at 125 l/hr. This decarbonated water and blow-down water were mixed and brought to the water storage tank. The water quality of the recovered water inside the water storage tank was determined as a function of the values shown below.

Water Quality of Recovered Water
electroconductivity: 8.5 μS/cm
pH: 5.8
Methyl orange alkalinity: <2 mg $CaCO_3$/l
Fe: 1.16 mg Fe/l
Ca: 0.01 mg Ca/l
Na: 0.07 mg Na/l
$PO_4$: 0.076 mg $PO_4$/l
Cl: 0.027 mg Cl/l
$SO_4$: 0.014 mg $SO_4$/l
$SiO_2$: 0.023 mg $SiO_2$/l
TOC (total organic carbon): 0.29 mg C/l Although the composition of colloidal iron and ionic iron in the recovered water varies with the temperature and pH, the ratio of colloidal iron to ionic iron was 40:60. Approximately 300–600 μg/l of ionic iron was present. This is much greater than the recommended upper limit of 100 μg/l of ionic iron for the ion exchange resin of the electrodeionizer in the subsequent step.

The recovered water was passed sequentially through a membrane filtration device and a chelate resin column under the same conditions as in Experiments 1 and 2. The treated water was then passed through the electrodeionizer under the same conditions as experiment 3. The applied voltage and current were set at 90V and 0.6 A.

The water quality of the outflow from the electrodeionizer was determined by measurement of the values shown below. It is clear that a high quality treated water can be obtained from the present invention.

Water Quality of Treated Water
Fe: 0.003 mg Fe/l
Ca: 0.0033 mg Ca/l
Na: 0.0004 mg Na/l
$PO_4$: 0.005 mg $PO_4$/l
Cl: 0.0007 mg Cl/l
$SO_4$: 0.014 mg $SO_4$/l
$SiO_2$: 0.003 mg $SiO_2$/l
TOC: 0.098 mg C/l Table 4 shows the electroconductivity as well as the $CO_2$ concentration of the inflow water entering the electrodeionizer and the outflow water.

TABLE 4

|  | Inflow | Outflow |
| --- | --- | --- |
| Conductivity (μS/cm) | 10 | 1 |
| $CO_2$ conc. (mg/l) | 9 | 3 |

Other embodiments of the present invention are also possible. For example, the decarbonation means of the condensate can be a spray column or a water storing diffusing column with no spacer material layer. It can also be a vacuum degasifier or a membrane degasifier. The membrane filtration device which removes the iron oxide from the recovered water can be an ultrafiltration membrane separator device, ceramic membrane separator device, or the like. To remove dissolved carbon dioxide gas to a higher degree, a membrane degasifier can be used following the step using the adsorption device.

The adsorption device which adsorbs any remaining iron ions in the outflow water of the membrane filtration device can be a gel or porous form sodium cation exchange column. However, because of its high selectivity, the chelate resin column is preferred at this step. Chelate resin columns have high selectivity, and because carbon dioxide ions which form the greater part of the ions in the recovered water are not loaded onto the chelate resin, a small capacity is sufficient for the chelate resin column. The chelate resin column can be made into a cartridge for easy replacement.

As noted above, with the use of the present invention of a water treatment apparatus for a fuel cell system, it is possible to remove carbon dioxide which is dissolved in high concentrations, as well as iron oxide, iron ions, and the like from the recovered water continually and efficiently, without using added chemicals and at a low cost. The present invention is also capable of obtaining cooling water which has low electroconductivity for the cell body.

What is claimed is:

1. A water treatment apparatus for a fuel cell system, comprising:

said fuel cell system which generates contaminated blowdown water and exhaust gas condensate;

a decontamination apparatus;

said decontamination apparatus includes a decarbonation means, a membrane filtration device, a chelate resin column and an electrodeionizer in series in the recited order;

said decarbonation means being effective in removing dissolved carbon dioxide gas from water;

said membrane filtration device being effective in removing iron oxide from outflow water of said decarbonation means;

said chelate resin column being effective to form chelate compound ligands with iron ions for selectively sorbing said iron ions in outflow water from said membrane filtration device;

said electrodeionizer being effective in removing trace ions in outflow water from said chelate resin column;

a cooling water supply pipe of a steam separator of said fuel cell electric power source; and a means for conveying decontaminated water from said electrodeionizer to said cooling water supply pipe.

2. A method for decontaminating water in a fuel cell system, comprising, in order, the steps of:

removing dissolved carbon dioxide gas from said contaminated water;

removing iron oxide from said contaminated water;

removing iron ions from said contaminated water;

said step of removing iron ions including passage of said water through a chelate resin column effective to form ligand bonds;

removing trace ions by electrodeionizing said contaminated water with an ion exchange resin and a membrane; and recycling the decontaminated water after said electrodeionizing step to a cooling water supply pipe of said fuel cell.

* * * * *